US009026257B2

(12) United States Patent
Kalich et al.

(10) Patent No.: US 9,026,257 B2
(45) Date of Patent: May 5, 2015

(54) REAL-TIME OPTIMIZATION OF HYDROPOWER GENERATION FACILITIES

(75) Inventors: Clint Kalich, Spokane, WA (US); Xin Shane, Spokane, WA (US)

(73) Assignee: Avista Corporation, Spokane, WA (US)

( * ) Notice: Subject to any disclaimer, the term of this patent is extended or adjusted under 35 U.S.C. 154(b) by 546 days.

(21) Appl. No.: 13/267,773

(22) Filed: Oct. 6, 2011

(65) Prior Publication Data
US 2013/0090774 A1    Apr. 11, 2013

(51) Int. Cl.
| | |
|---|---|
| *G06Q 50/06* | (2012.01) |
| *F03B 13/06* | (2006.01) |
| *F03B 3/04* | (2006.01) |
| *F03B 3/06* | (2006.01) |
| *G06F 17/50* | (2006.01) |
| *G06Q 10/04* | (2012.01) |
| *G06Q 10/06* | (2012.01) |
| *G06Q 30/02* | (2012.01) |

(52) U.S. Cl.
CPC ............ *G06F 17/5086* (2013.01); *G06Q 10/04* (2013.01); *G06Q 10/06* (2013.01); *G06Q 30/02* (2013.01); *G06Q 50/06* (2013.01); *G06F 2217/08* (2013.01)

(58) Field of Classification Search
CPC ........... G06Q 50/26; F03B 13/06; F03B 3/04; F03B 3/06; Y02E 10/20; Y02E 10/22
USPC ............................ 700/286–287, 290; 705/412
See application file for complete search history.

(56) References Cited

U.S. PATENT DOCUMENTS

| | | | |
|---|---|---|---|
| 4,255,787 A | | 3/1981 | Hoffmann et al. |
| 4,674,279 A | | 6/1987 | Ali et al. |
| 4,794,544 A | | 12/1988 | Albright et al. |
| 5,347,446 A | | 9/1994 | Iino et al. |
| 5,742,515 A | | 4/1998 | Runkle et al. |
| 5,757,665 A | | 5/1998 | Nestler et al. |
| 5,812,421 A | | 9/1998 | Fujii et al. |
| 5,913,179 A | | 6/1999 | Sutton et al. |
| 5,953,227 A | * | 9/1999 | March et al. .................... 700/36 |
| 6,038,494 A | * | 3/2000 | Fisher et al. .................. 700/287 |
| 6,269,287 B1 | * | 7/2001 | March ........................... 700/287 |
| 6,490,506 B1 | * | 12/2002 | March ........................... 700/286 |
| 6,889,141 B2 | | 5/2005 | Li et al. |

(Continued)

OTHER PUBLICATIONS

System Optimization for a Micro Hydroturbine; 188 pages; Gonzalez et al., Apr. 18, 2011.*

(Continued)

*Primary Examiner* — Ronald Hartman, Jr.
(74) *Attorney, Agent, or Firm* — Lee & Hayes, PLLC

(57) ABSTRACT

Operation of a hydropower generation facility may be optimized by consideration and analysis of multiple factors influencing function of the facility. Aspects of the facility and surrounding hydraulic system are represented in a model that may include efficiency curves for hydropower turbines. Efficiency curves for one or more turbines are approximated by piecewise linear functions. The use of piecewise linear representations allows for calculation of recommended operational settings as well as predicted outputs in real time. An optimization system may consider input data such as weather and market prices for electricity. The input data may also include desired operational outputs of the hydropower generation facility. A user interface may present recommendations for specific operational settings to achieve the desired operational outputs.

22 Claims, 7 Drawing Sheets

(56) References Cited

U.S. PATENT DOCUMENTS

| | | | |
|---|---|---|---|
| 7,349,831 | B2 | 3/2008 | Belcher et al. |
| 7,873,442 | B2 | 1/2011 | Tsui |
| 8,626,352 | B2 * | 1/2014 | Kalich et al. ............... 700/291 |
| 2003/0041016 | A1 | 2/2003 | Spool et al. |
| 2003/0041017 | A1 | 2/2003 | Spool et al. |
| 2003/0041038 | A1 | 2/2003 | Spool et al. |
| 2003/0041039 | A1 | 2/2003 | Spool et al. |
| 2003/0093332 | A1 | 5/2003 | Spool et al. |
| 2004/0253097 | A1 | 12/2004 | Kao |
| 2005/0102173 | A1 | 5/2005 | Barker et al. |
| 2005/0160128 | A1 | 7/2005 | Fardanesh |
| 2006/0072014 | A1 | 4/2006 | Geng et al. |
| 2006/0206240 | A1 | 9/2006 | Tsui |
| 2007/0112443 | A1 | 5/2007 | Latham et al. |
| 2007/0150157 | A1 | 6/2007 | Lee et al. |
| 2007/0162189 | A1 * | 7/2007 | Huff et al. .................. 700/287 |
| 2008/0004721 | A1 * | 1/2008 | Huff et al. .................... 700/48 |
| 2008/0195362 | A1 | 8/2008 | Belcher et al. |
| 2008/0255893 | A1 | 10/2008 | Barker et al. |
| 2009/0012762 | A1 * | 1/2009 | Ellis et al. ...................... 703/7 |
| 2009/0021011 | A1 | 1/2009 | Shifrin et al. |
| 2009/0093997 | A1 * | 4/2009 | Fluegge et al. ............ 702/182 |
| 2009/0134623 | A1 | 5/2009 | Krouse |
| 2009/0216385 | A1 * | 8/2009 | Ebner et al. ................ 700/294 |
| 2011/0283705 | A1 | 11/2011 | Oliver |
| 2011/0313777 | A1 | 12/2011 | Baeckstroem et al. |
| 2012/0161444 | A1 * | 6/2012 | Tarnowski .................... 290/44 |

OTHER PUBLICATIONS

Optimization of Hydro Power Plants Performance Importance of Rehabilitation and Maintenance in Particular for the Runner Profiles; 12 pages; Cateni et al., Sep. 3-6, 2008.*

Practical application of successive linear programming for reservoir operations at Manitoba Hydro; 60 pages; K.K. Reznicek et al.; May 1989.*

Mini-Hydro Power; 8 pages; Oct. 11, 2010 (as evidenced by Wayback Machine printout).*

Internet Archive (Wayback Machine); 2 pages; Evidence for the "Mini-Hydro Power" article as the page appeared on Oct. 11, 2010; Printed from Internet on Jan. 28, 2014.*

Final Office Action for U.S. Appl. No. 13/014,555, mailed on Nov. 26, 2013, Clint Kalich, "Hydroelectric Power Optimization", 10 pages.

Non-Final Office Action for U.S. Appl. No. 13/014,555, mailed on Apr. 3, 2013, Clint Kalish et al., "Hydroelectric Power Optimization", 9 pages.

Non-Final Office Action for U.S. Appl. No. 13/014,602, mailed on Mar. 28, 2013, Clint Kalich et al., "Hydroelectric Power Optimization Service", 10 pages.

"Solving Linear Systems: Irerative Methods and Sparse Systems", COS 323, Princeton University lecture notes, 2006, pp. 1-25.

Aquatic Informatics, retrieved on Mar. 8, 2011 at <<http://www.aquaticinformatics.com/>>, 1 page.

CddHoward Consulting Ltd., retrieved on Mar. 8, 2011 at <<http://www.cddhoward.com/presentations.html>>, 1 page.

Reznicek, et al., "Practical application of successive linear programming for reservoir operations at Manitoba Hydro", Proceedings of the Baltimore Symposium, May 1989, 12 pages.

RiverMorph Stream Restoration Software, retrieved on Mar. 8, 2011 at <<http://www.rivermorph.com/>>, 1 page.

RiverWareTM, retrieved on Mar. 8, 2011 at <<http://cadswes.colorado.edu/PDF/RiverWare/RiverWare-Brochure.pdf>>, 8 pages.

Synexus Global, retrieved on Mar. 8, 2011, at <<http://www.synexusglobal.com/product.html>>, 1 page.

"Vista Reference Guide Overview", Synexus Global, retrived on Jul. 29, 2011 at <<http://www.synexusglobal.com/pdfs/Reference_Guide_Supplement_A_Overview_Version_5_0.pdf>>, 69 pages.

WRCS Hydrology and Hydrolics Software Suite, retrieved on Mar. 8, 2011 at <<http://www.waterengr.com/>>.

Gonzalez et al., "System Optimization for a Micro Hydroturbine", Apr. 18, 2011, 188 pages.

"Mini-Hydro Power", Oct. 11, 2010, 8 pages.

Wayback Machine, Evidence for the "Mini-Hydro Power" article as the page appeared on Oct. 11, 2010, Printed from the Internet Jan. 28, 2014.

Office Action for U.S. Appl. No. 13/014,555, mailed on Jun. 2, 2014, Clint Kalich, "Hydroelectric Power Optimization", 9 pages.

* cited by examiner

REAL-TIME OPTIMIZATION OF HYDROPOWER GENERATION FACILITIES

RELATED APPLICATIONS

This application is related to U.S. patent application Ser. Nos. 13/014,555 and 13/014,602 both filed on Jan. 26, 2011, which are incorporated by reference herein in their entireties.

BACKGROUND

Hydroelectric power generation generally involves harnessing the force of moving water to generate electricity. In most cases, a hydroelectric facility generates electricity from the potential energy of dammed water that drives a water turbine. Often, a hydroelectric power facility may generate electricity for an entire area; however, some hydroelectric facilities are controlled by and for a single entity, such as a factory. There are many factors involved in the operation of hydroelectric power facilities. For example, constraints such as reservoir volume, a difference in height (i.e., a head) between the reservoir (i.e., a forebay) and the water's outflow (i.e., a tailrace), turbine efficiency, water flow rates, and even water rights may each effect the amount of power generated at any given time.

Managers and operators of hydroelectric power facilities are often faced with events that require intraday modifications to operational plans. These real-time changes may be based on unexpected events or differences between actual operation and predicted operation. In order to react rapidly to real-time events, these operators may need to quickly determine how changes in the operation of a hydroelectric power facility affect energy output, water flow, costs, etc. to determine appropriate flow rates through turbines, pumped-storage times, spill flow volumes, and the like. Tools and techniques for accurately and quickly optimizing the operation of a hydroelectric power facility in real time are of significant assistance to the managers and the operators.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments of the present disclosure are directed to, among other things, providing recommendations and predicting results for optimized operation of a hydropower generation facility. Hydropower generation facilities operate under numerous fixed constraints (e.g., a number of turbines, spillway curve, etc.) and changeable constraints (e.g., a reservoir level; discharge volume). Operators of hydropower generation facilities can alter operations by varying the number of turbines generating electricity, changing a spill rate, altering a reservoir elevation, and the like. Under a given set of constraints, operational choices may achieve a range of outcomes varying from, for example, shutting down all of the turbines to running all of the turbines at maximum capacity.

Within a range of possible settings controlled by an operator of the hydropower generation facility, there may be settings that maximize power generation, maximize generation efficiency, achieve predetermined spill levels, achieve predetermined reservoir elevation levels, maximize revenue, minimize costs, and the like. Out of all the possible ways to operate the various systems under the control of the hydropower generation facility, the hydropower generation facility may select an operation solution that satisfies the constraints while minimizing the costs. Relative values of different outcomes may be considered (e.g., maintaining a threshold level of power generation vs. maintaining a threshold discharge volume) to determine an optimal operating solution.

Calculation of the optimal operating solution may depend on inputs provided by the operators, weather conditions, market prices for electricity, trading strategies, and the like. Efficiency curves of turbine operation may be represented by piecewise linear approximations to simplify the computation of operational parameters that maximize efficiency of electricity generation. The optimal operating solution may use a model of the relevant hydraulic system (e.g., the hydroelectric generation facility, the upstream reservoir, the downstream river channel, etc.) to generate recommendations for the operators (e.g., change gate positions) and to calculate predicted results (e.g., quantity of electricity generated) if the recommended operational parameters are implemented.

This brief introduction is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many implementations.

Illustrative Architecture

Figure 1:
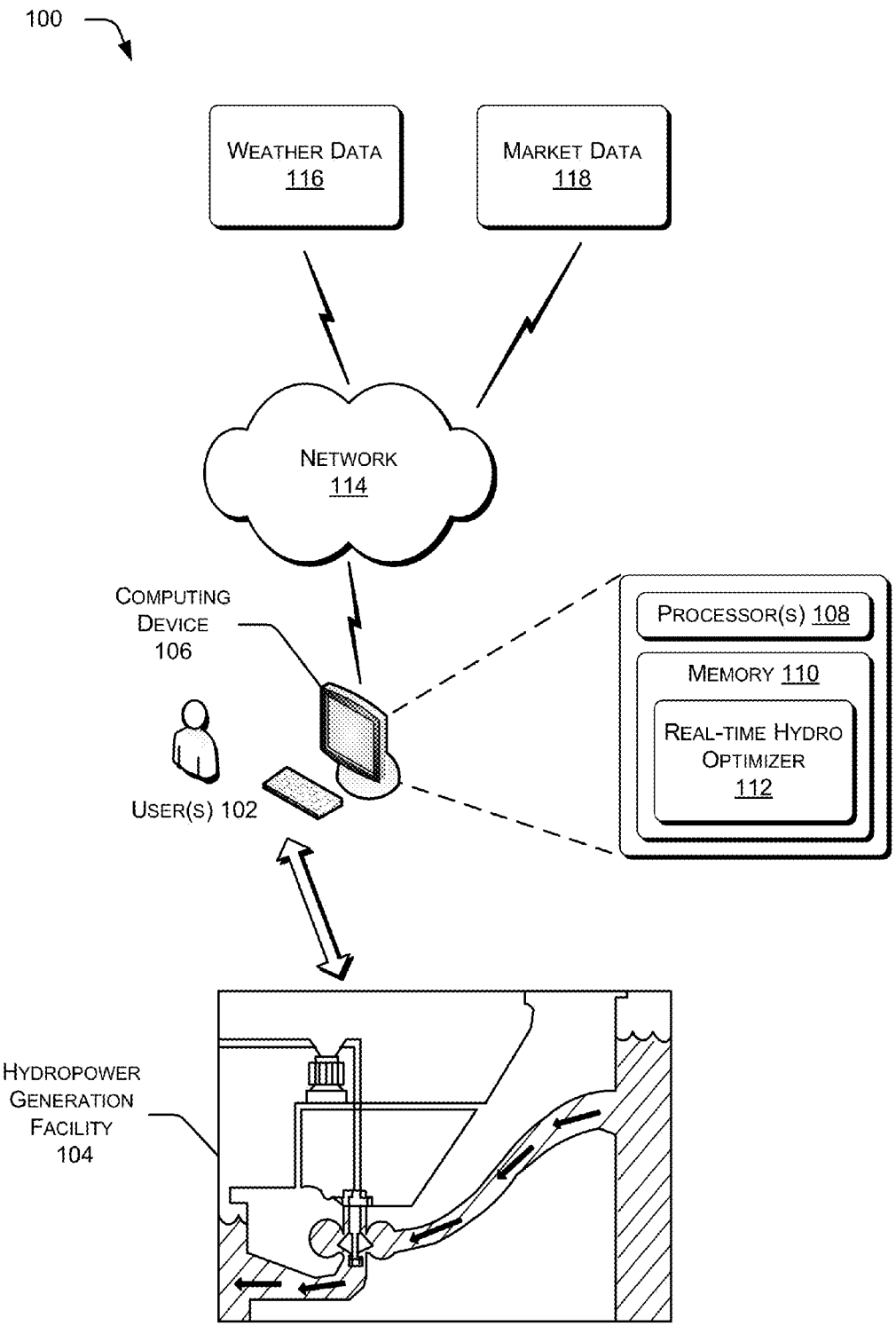
FIG. 1 illustrates an example architecture for optimizing operation of a hydropower generation facility.

FIG. 1 depicts an illustrative architecture 100 in which techniques for analyzing and optimizing operation of the hydropower generation facility may be implemented. In architecture 100, one or more users 102 control a hydropower generation facility 104 such as a hydroelectric dam. The users 102 may include operators physically located at the hydropower generation facility 104 and directly manipulating operation of equipment within the facility and/or traders that make decisions about use of the facility and about energy contracts. In some implementations, the traders and/or automated computer control systems might also directly control operation of the hydropower generation facility 104. Control of the hydropower generation facility 104 may be through mechanical or electrical interfaces as well as through computer-controlled interfaces presented to the user 102 by a computing device 106.

The computing device 106 is illustrated as a personal computing device; however, other types of computing devices may include laptop computers, portable digital assistants ("PDAs"), mobile phones, a thin client, mainframe computers, super computers, data centers, and so forth. As illustrated here, the computing device 106 may be equipped with one or more processors 108 and memory 110. The memory 110 may be used to store any number of functional components that are executable on processor(s) 108 such as a real-time hydropower optimizer 112. In other implementations, the real-time hydropower optimizer 112 may maintained in whole or part on a different computing device such as a server computer and the computing device 106 may function merely as a thin client displaying output and receiving input. Additionally, the real-time hydropower optimizer 112 may be maintained as a web-based service accessible from the computing device 106 or any other computing device connected to the Internet or other communications network.

Depending on the configuration of the computing device 106, memory 110 may be an example of computer-readable storage media and may include volatile and nonvolatile memory. Thus, memory 110 may include, but is not limited to, random-access memory ("RAM"), read-only memory ("ROM"), electrically erasable programmable read-only memory ("EEPROM"), flash memory, or other memory technology, or any other non-transmission medium which can be used to store computer instructions and other data which can be accessed by the computing device 106. Computer-readable storage media, however, does not include any data in a modulated data signal, such as a carrier wave or other propagated transmission medium.

The computing device 106 may be in commutative connection with a network 114. Network 114 may include any one or a combination of multiple different types of wired or wireless networks, such as cable networks, the Internet, local area networks (LANs), and other private and/or public networks. The network 114 may connect the computing device 106 to the Internet for providing web-based access to the real-time hydropower optimizer 112 or to a remote computer that maintains all or part of the real-time hydropower optimizer 112. The network 114 may also provide weather data 116 and market data 118 to the computing device 106 for use by the real-time hydropower optimizer 112. Alternatively, the real-time hydropower optimizer 112 may obtain the weather data 116 and the market data 118 by other routes such as transfer from storage media such as an optical disk.

The weather data 116 may include information such as temperature, rainfall, humidity, ultraviolet light levels, dew point, and other types of conventional weather or meteorological information. The weather data 116 may include historical data, current data, and forecast future data. The market data 118 may include pricing data for the purchase or sale of electricity in wholesale and/or retail markets. The market data 118 may also include known or predicted changes in electricity rates over time such as intraday rate changes (e.g., more expensive during peak hours and less expensive at night) as well as changes over a longer time frames such as over the course of a year (e.g., lower-cost in the spring when hydropower generation capacity is higher).

Illustrative Efficiency Curves

Rather than graphing turbine efficiency directly, efficiency curves show relationships between other variables that are easier to measure. Specifically, a ratio of generated power (e.g., electricity) to head height is taken as representative of turbine efficiency. Head height, or "head," represents the difference in elevation between the reservoir that supplies water to the turbine and the water level at the outflow from the turbine.

The power equation for hydropower systems represents the relationships between many factors that affect power output, such as turbine efficiency, head, and flow of water through the turbine. The equation for calculating power is:

$$P = (1/11.82) \cdot \eta \cdot h \cdot Q \qquad \text{(Equation 1)}$$

where P=power, η=efficiency, h=head, and Q=flow rate. Power may be measured in watts. Head height may be measured in feet. Flow may be measures in cubic feet per second (CFS). When both sides are divided by h (head), the ratio of power to head height or P/h is:

$$P/h = (1/11.82) \cdot \eta \cdot Q \qquad \text{(Equation 2).}$$

Thus, P/h is a function of the flow rate (Q) and P/h is indicative of turbine efficiency (η). A higher P/h value corresponds with a higher efficiency (i.e., a more efficient turbine generates more power increasing the value of the P/h ratio). Both the rate of flow of water through the turbine and the head height affect the amount of power generated by the turbine. Turbine design, a spillway curve, tailrace, and other factors may affect the efficiency of a given turbine. An efficiency curve for a hydropower turbine may be represented as the flow rate (Q) as the independent variable and the ratio of power to head (P/h) as the dependent variable.

Figure 2:
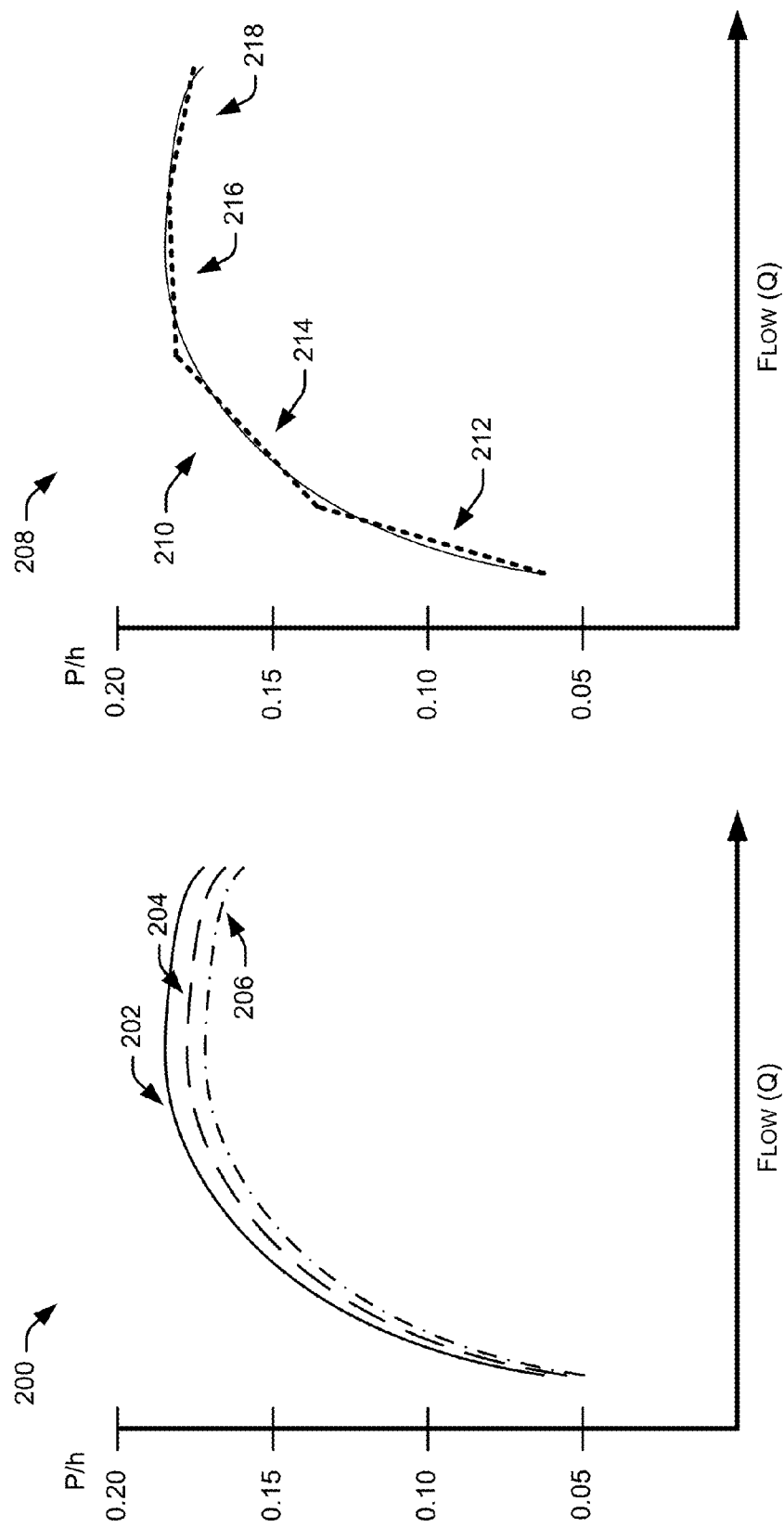
FIG. 2 illustrates changes in an efficiency curve for a hydropower turbine at different head heights and a piecewise linear representation of a hydropower turbine efficiency curve.

FIG. 2 shows illustrative efficiency curves for a hydropower turbine. An efficiency curve correlates the efficiency (represented as P/h) at which the hydropower turbine generates electricity. The P/h ratio typically varies between 0 and 1, but may exceed 1 depending on the units used for power (P) and for head height (h). The efficiency of a turbine represents a fraction of the theoretical maximum amount of electricity that is produced by the turbine.

Graph 200 in FIG. 2 shows the effects of changes in head height on an efficiency curve. The potential energy of water stored in the reservoir above the turbine changes as the head changes, and thus, the efficiency curve of the turbine when a given volume of water passes through the turbine also changes with changes in head height. Curve 202 represents the efficiency curve of the turbine when operating at a first head height. Curve 204 represents the efficiency curve of the turbine when operating at a second head height. Curve 206 represents the efficiency curve of the turbine when operating at a third head height. Thus, for a given turbine the efficiency depends not only on the flow but also on the head height.

Graph 208 in FIG. 2 shows the approximation of an efficiency curve 210 as a continuous piecewise linear representation. Interpolation at any point in the linear representation is possible because of the continuity of the linear segments. In this example, the continuous piecewise linear representation includes four linear segments 212, 214, 216, and 218. Although, the efficiency curve 210 may be approximated by a greater or a lesser number of linear segments than the four linear segments. Identifying the efficiency of the turbine from the piecewise linear representation may include identifying one of the linear segments 212-218 that corresponds to a given flow value. Once the appropriate linear segment 212-218 is identified, it is computationally simple to determine the efficiency. A more complex representation of the efficiency curve, for example a non-linear representation, may require more time to compute and thereby make real-time analysis unfeasible particularly when modeling complex systems such as a hydroelectric generation facility 104 with dozens of turbines.

Relationships between other aspects of a hydroelectric generation facility 104 may also be represented as curves than can be modeled using a piecewise linear representation. For example, relationships between discharge volume (cfs) versus tailrace elevation (feet), volume of spill over spillway (cfs) versus elevation (ft), and the difference between inflow volume and turbine capacity versus bypass spill/spill through a diversion tunnel (cfs) may be simplified with a piecewise linear representation.

Figure 3:
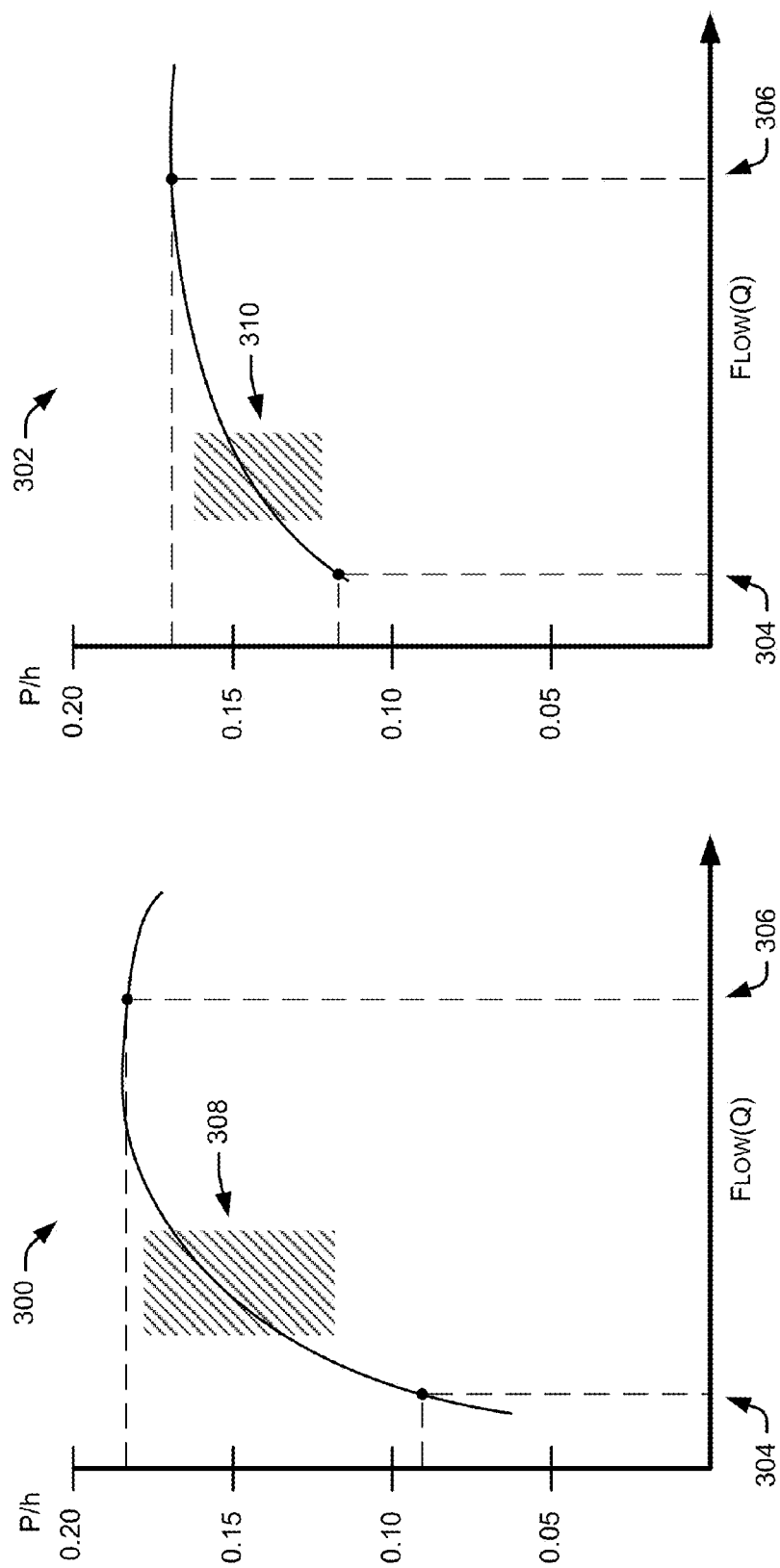
FIG. 3 illustrates efficiency curves for two different hydropower turbines.

FIG. 3 shows a comparison of efficiency curves for two different hydropower turbines. The first efficiency curve 300 starts at a low efficiency but rapidly increases to a higher efficiency as the flow increase. In contrast, the second efficiency curve 302 is a flatter curve with less change between the efficiency at low flow and at high flow. An illustrative optimization scenario may include identifying operational settings for both of these two turbines to generate a requested amount of electricity at the highest possible level of efficiency.

If the request is for a relatively small amount of electricity, the corresponding flow on the efficiency curves is shown by location 304. Visual examination of the efficiency curve 300 for the first turbine shows that this level of generation will have the turbine operating at approximately at a moderate P/h level. However, the difference in the efficiency curve 302 for the second turbine shows that a second turbine will generate the same amount of electricity with greater efficiency. Thus, for generating the amount of electricity represented by the location 304 on the efficiency curves 300 and 302, it is most efficient to meet that demand with the second turbine.

A request for a relatively large amount of electricity is shown here by position 306 on the efficiency curves 300 and 302. In this example, the differences in the efficiency curves result in use of the first turbine as the most efficient option. For the first turbine, generating the amount of electricity represented by position 306 will cause the turbine to operate near the peak of its P/h range. However, when generating the same amount of electricity, the second turbine will operate at a lower efficiency.

Although the problem as presented here is relatively easy to solve by mere visual inspection, identifying optimized operational parameters of hydroelectric generation facilities 104 becomes more challenging, and impossible to solve by visual inspection or manual calculation in the timeframe necessary for real-time operations, when the requested amount of electricity requires operation of multiple turbines and optimization involves determining the relative rate at which to run each of multiple turbines and possibly determining which available turbines are used and which are allowed to idle. Further, as the problem becomes more computational intensive (e.g., more turbines, more constraints, etc.), inefficient models (e.g., models that do not simplify complex relationships) may be incapable of providing timely and accurate results.

The analysis may become further involved by consideration of rough zones that are flow levels for a turbine at which the harmonic vibration can potentially damage the equipment. Operators try to avoid running turbines in a rough zone, but may allow a turbine to operate in a rough zone while flow increases to a higher level that is beyond the rough zone. The rough zone for the first turbine is shown by region 308 and the rough zone for the second turbine is shown by region 310. Some operational settings that would be otherwise be efficient may be undesirable because of the presence of rough zones 308 and 310 in the efficiency curves 300 and 302. Rough zones 308 and 310 may also cause optimized settings to result in generation of more electricity than was initially requested. For example, increasing the flow through a turbine beyond the rough zone 308 or 310 may satisfy a request for electricity by creating more than the requested amount of electricity.

Rough zones 308 and 310 may be modeled by rejecting any optimization solution that causes a turbine to operate within rough zones 308 and 310. In some implementations, this may be addressed by iteratively changing the recommended flow setting for a turbine operating in rough zones 308 and 310, recalculating appropriate operating settings for any other turbines, and once again checking to see if any of the turbines are set to operate within a rough zone. In other implementations, the piecewise linear representation of a efficiency curve 300 and 302 may represent a rough zone either by including a linear segment that corresponds to zero or negative efficiency for the range of flow values of the rough zones 308 and 310. Alternatively, the piecewise linear representation may include a discontinuity that corresponds to the rough zone so that if a recommendation for optimized operational settings attempts to use a flow value that causes a turbine to operate in the rough zones 308 and 310, the piecewise linear representation will be unable to solve for an efficiency value due to the discontinuity.

Illustrative Components

Figure 4:
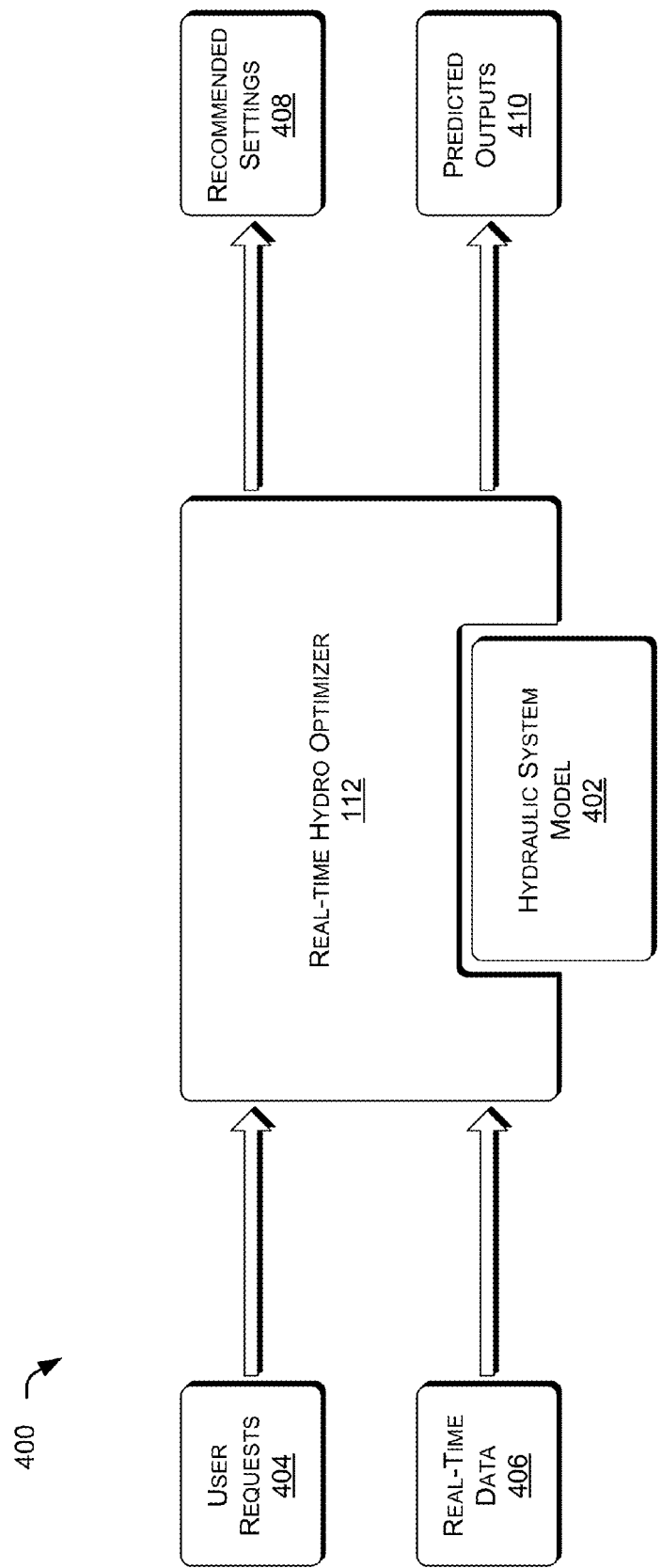
FIG. 4 illustrates an example real-time hydropower optimizer which receives inputs and generates outputs.

FIG. 4 shows a block diagram 400 of the real-time hydropower optimizer 112 shown in FIG. 1. The real-time hydropower optimizer 112 may calculate on optimal operation solution for a hydropower generation facility 104 using piecewise linear representations of turbine efficiency curves as discussed above. The turbine efficiency curves may be included in a hydraulic system model 402 that is a part of, or available to, the real-time hydropower optimizer 112.

The hydraulic system model 402 may be a mathematical model of a specific hydropower generation facility 104. The real-time hydropower optimizer 112 may be adapted for addressing the needs of various hydropower generation facilities 104 by including an appropriate hydraulic system model 402. In some implementations, the real-time hydropower optimizer 112 may remain essentially unchanged when one hydraulic system model 402 is exchanged for another. Although shown in FIG. 4 as including only one hydraulic system model 402, the real-time hydropower optimizer 112 may access multiple hydraulic system models. For example, individual hydropower generation facilities may be represented by separate hydraulic system models, and by inclusion of multiple hydraulic system models the real-time hydropower optimizer 112 may be able to optimized operation across multiple facilities.

The hydraulic system model 402 may be created by programmers based on features of a hydropower generation facility 104 that are measured, observed, obtained from experienced operators, obtained from previous analysis of similar facilities, obtained from manufacture's specifications for equipment, and the like. Once created, the hydraulic system model 402 may be used without further changes. At times, the hydraulic system model 402 may be updated if the hydropower generation facility 104 is modified and/or if more accurate or complete information on which the model is based becomes available.

The hydraulic system model 402 may include many characteristics of a hydropower generation facility 104 and the surrounding hydrology such as:

Upstream hydrology,
Description of the reservoir,
Flood control curve,
Physical assets of the hydropower generation facility,
Power/efficiency curves for each turbine,
Power/efficiency curve for the facility as a whole,
Head,
Tailrace,
Spillway curve, Voltage control,
Turbine starting and stopping order,
Turbine rough zones, and
Turbine maximum and minimum operating parameters.

The hydraulic system model 402 may also include other characteristics. For each characteristic, the model may include a range of possible values, a maximum rate of change of the values, any interrelationships with other characteristics, and the like.

The real-time hydropower optimizer 112 receives user requests 404 for specific behavior or output from the hydropower generation facility 104. The user requests 404 may include requests for:
Generation of electricity,
Following up flexibility,
Following down flexibility,
Regulation reserves,
Spinning reserves,
Non-spinning reserves,
MVars,
Motoring of turbines,
Discharge/spill of water, and
Elevation targets.

Each of the user requests 404 may be made according to a plan, user experience, emergent situations that arise, or for other reasons. Once the user requests 404 are received by the real-time hydropower optimizer 112, the real-time hydropower optimizer 112 calculates a solution that satisfies the user requests 404. If fulfilling one of the user requests 404 precludes fulfilling another of the user requests 404 then the real-time hydropower optimizer 112 weighs the competing requests to determine which one should be fulfilled. The relative weights assigned to different requests may be indicated in advance by a user 102 of the real-time hydropower system 112 such as when making the request. In other instances, the relative weights may be automatically assigned by the real-time hydropower optimizer 112.

The real-time hydropower optimizer 112 also receives real-time data 406. The real-time data 406 may include the weather data 116 and the market data 118 shown in FIG. 1. The weather data 116 may describe humidity, rain fall volume, air temperature, water temperature, and the like. The market data 118 may describe buy prices and offer prices for a unit of electricity.

The real-time data 406 also includes data about the current configuration of the hydropower generation facility 104 such as:
Inflow volumes,
Outflow volumes,
Forebay elevation,
Gate positions,
Generated electricity for each turbine,
Generated electricity for the whole facility, and
Cumulative elevation changes.

The real-time data 406 may also include other data about current settings and functioning of the hydropower generation facility 104.

The real-time hydropower optimizer 112 may provide recommended settings 408 for operating the hydropower generation facility 104 in order to achieve the user requests 404 given the real-time data 406 and the hydraulic system model 402. The recommended settings 408 may include settings for operational parameters of the hydropower generation facility 104 that a user 102 (e.g., operator, trader, etc.) may control such as:
Gate positions,
Spill volumes,
Generating turbines,
Motoring turbines,
Automatic generation control (AGC) turbines, and
Idle turbines.

The recommended settings 408 may also include recommendations for other operational settings of the hydropower generation facility 104.

Additionally, the real-time hydropower optimizer 112 may calculate predicted outputs 410 that will result if the recommended settings 408 are implemented. The predicted outputs 410 may include outputs such as:
Generated electricity per hydropower turbine,
Total generated electricity,
Turbine reserves,
Total reserves,
Surplus capabilities,
Ending forbay elevation,
Generation flow,
Spill flow,
Turbine efficiency,
System efficiency,
Rough zone violations and magnitude, and
Operating margins/profits.

The predicted outputs 410 may also include predictions for outputs other than those listed above. The real-time hydropower optimizer 112 may repeat the calculations and generation of recommended settings 408 and predicted outputs 410 at a given frequency or a time step. The time step may be any frequency such as, for example, from one second to one hour. For example, one possible time step is ten minutes. The frequency with which the real-time hydropower optimizer 112 repeats analysis of inputs and generates outputs may be user configurable or may be fixed.

Figure 5:
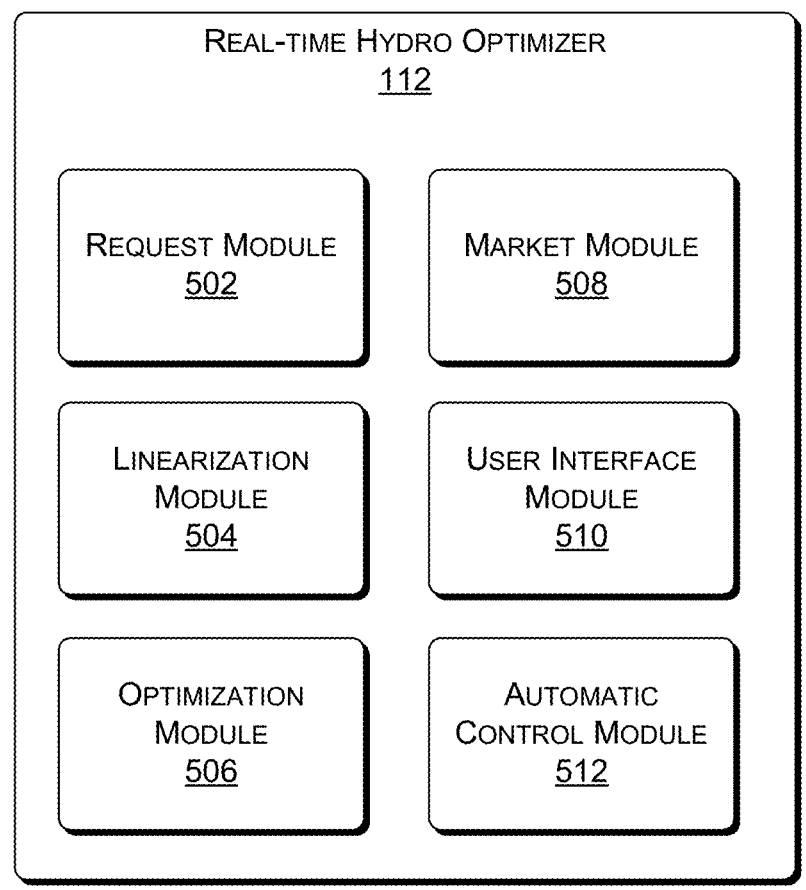
FIG. 5 illustrates the real-time hydropower optimizer of FIG. 4 in greater detail.

FIG. 5 shows the real-time hydropower optimizer 112 in greater detail. The real-time hydropower optimizer 112 may include a request module 502 that receives a request from a user 102. The request may include any of the types of user requests 404 discussed above in conjunction with FIG. 4. For example, the request may be a request for the generation of a specific quantity of electricity. The request module 502 may receive the request through a user interface that allows the user 102 to input the request through selection of icons on a graphical user interface, operation of a pull down menu, typing numeric or textual values, or the like.

A linearization module 504 that may also be included in the real-time hydropower optimizer 112 generates piecewise linear representations of hydropower turbine efficiency curves. Piecewise linear functions that generate the piecewise linear representations may be defined on n-dimensional Euclidean space, or more generally any vector space or affine space, as well as on piecewise linear manifolds, simplicial complexes, and so forth. In each case, the piecewise linear function may be real-valued, or it may take values from a vector space, an affine space, a piecewise-linear manifold, or a simplicial complex.

A piecewise linear representation of a hydropower turbine efficiency curve may be similar to curve 208 shown in FIG. 2. The linearization module 504 may also create piecewise linear representations of other data besides hydropower turbine efficiency curves such as, for example, a spillway curve, a flood control curve, etc.

An optimization module 506 can be implemented as part of the real-time hydropower optimizer 112 and identify operational parameters for a hydropower generation facility 104 based on the piecewise linear representations created by the linearization module 504. The operational parameters may result in generation of electricity that is at least sufficient to satisfy a request for electricity received by the request module 502 and do so at a higher level of efficiency than any other set of operational parameters. The operational parameters identified by the optimization module 506 may be appropriate for the hydropower generation facility 104 represented by the hydraulic system model 402 that is available to the real-time hydropower optimizer 112. The operational parameters may include any of the recommended settings 408 discussed above in conjunction with FIG. 4. For example, the operational parameters may indicate which of the multiple turbines should be operated and the flow rate and/or amount of generated electricity at which those turbines should operate. In some implementations, the operational parameters may be provided at a more granular level indicating specifically, which spillways should be used, which gates should be raised and the like. The specific operational parameters may be presented to an operator for implementation without necessarily informing the operator of the effects that the changes will have on operation and efficiency of the hydropower generation facility 104.

The real-time of hydropower optimizer 112 may also include a market module 508. The market module 508 identifies timing for generation of electricity based on a variable market price for electricity. The market price for electricity may be obtained as part of the market data 118. Identifying the change in electricity pricing with time, it is possible to match the timing of electricity generation with those times when the market will pay a higher price for the electricity. For example, the market module 508 may suggest generating electricity during the day when demand and market prices are higher than at night when prices are lower. The market module 508 may also consider changes in the predicted efficiency of electricity generation to identify operational parameters that result in maximum revenue or profits (e.g., difference between revenue and operating costs).

A user interface module 510 of the real-time of hydropower optimizer 112 may present recommended operational parameters to a user. The user interface module 510 may also present predicted outputs 410 of the hydropower generation facility 104 that will result if the recommended operational parameters are implemented. The user interface module 510 may also generate user interfaces for receiving user requests 404.

An automatic control module 512 may also be included in the real-time hydropower optimizer 112. The automatic control module 512 may automatically modify operation of the hydropower generation facility 104 by applying the operational parameters identified by the optimization module 506. For example, once optimized operational parameters are identified the automatic control module 512 may provide those parameters to a supervisory control and data acquisition (SCADA) system that modifies operation of the hydropower generation facility 104 by, for example, closing or opening gates, starting or stopping turbines, and the like. Use of the automatic control module 512 may create a closed loop system in which operational parameters identified in real-time are automatically applied by the system and modified when necessary based on changes in real-time data 406 or updated user requests 404.

Illustrative Processes

Figure 6:
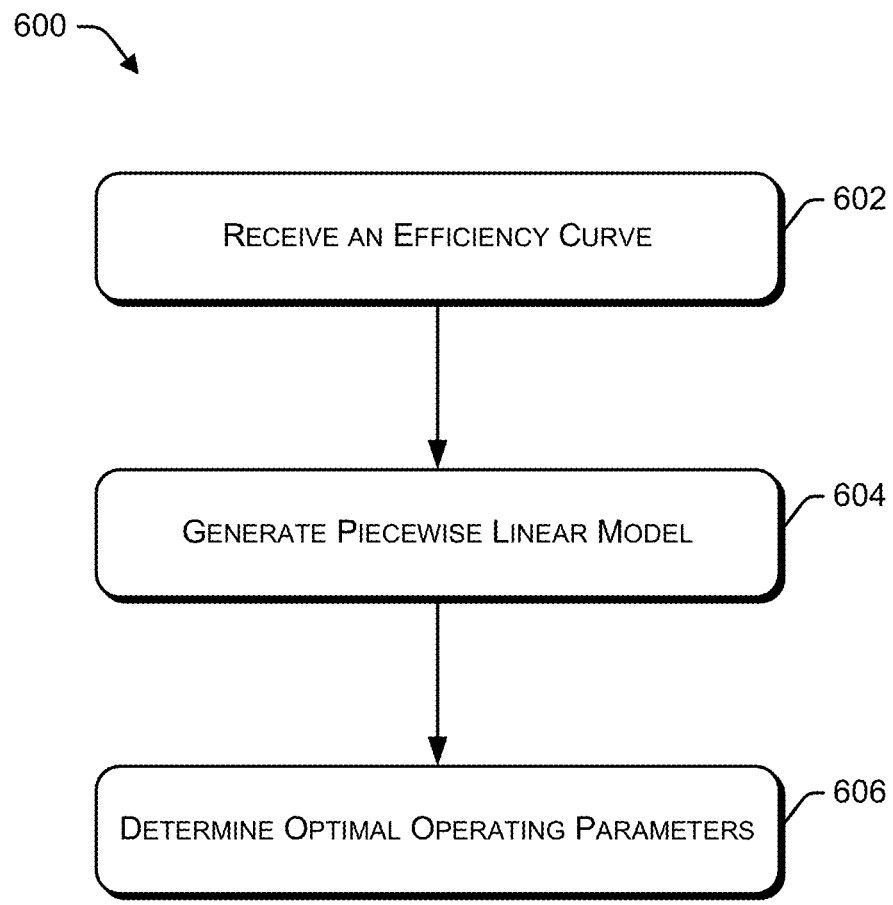
FIG. 6 is an example flow diagram showing determination of optimal operating parameters for a hydropower generation facility.
Figure 7:
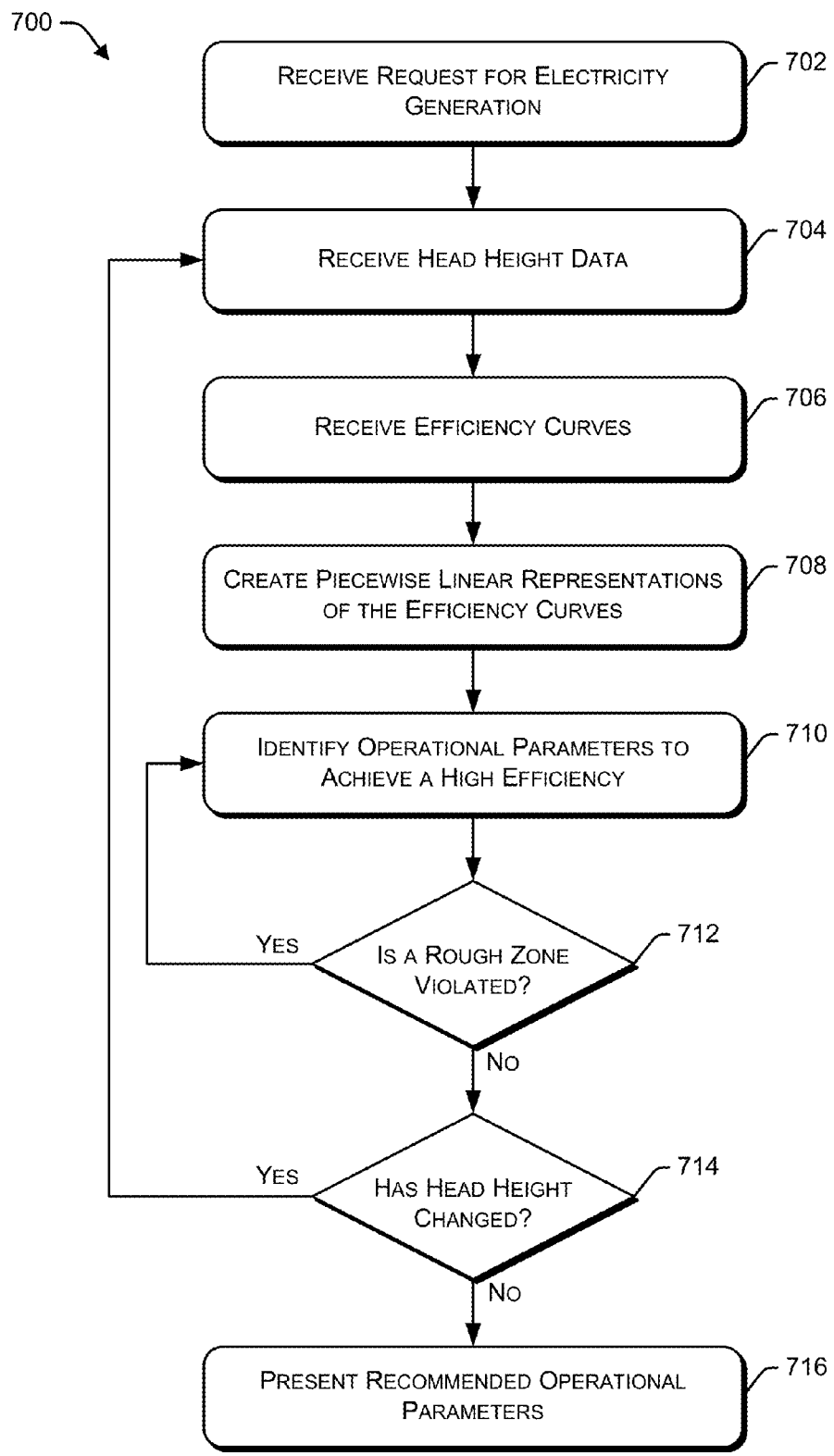
FIG. 7 is an example flow diagram showing generation of recommended operational parameters for a hydropower generation facility.

FIGS. 6 and 7 are flow diagrams showing processes 600 and 700 for optimizing operation of a hydropower generation facility 104. Processes 600 and 700 may, but need not, be implemented using the architecture of FIG. 1. The process are illustrated as a logical flow graph each operation of which represents a sequence of the operation can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 600 includes receiving an efficiency curve for a hydropower turbine at 602. The efficiency curve may be received as part of a hydraulic system model 402. In some implementations, the efficiency curve provides an operational efficiency of the hydropower turbine for a given rate of water flowing through the hydropower turbine. In other implementations, the efficiency curve provides an operational efficiency of the hydropower turbine for a given quantity of electricity generated by the hydropower turbine. Additionally, the efficiency curve may provide an operational efficiency of the hydropower turbine for a given flow rate through the hydropower turbine.

At 604, the process 600 generates a piecewise linear model of the efficiency curve. The piecewise linear model approximates the efficiency curve as a series of linear segments. In some implementations, the piecewise linear model may be a continuous function, but in other implementations the model may be a discontinuous function.

At 606, the process 600 determines optimal operating parameters for the hydropower turbine based on the piecewise linear model generated at 604. The optimal operating parameters may be determined by identifying a linear segment of the piecewise linear model that corresponds to a rate of water flowing through the hydropower turbine or on a quantity of electricity generated by the hydropower turbine. Once one of the linear segments is identified as the relevant segment based on the flow/megawatt level of the hydropower turbine, a corresponding efficiency of the hydropower turbine is identified based on the linear segment. Because the statement is linear, identifying the efficiency is relatively computationally simple, and thus, is possible to calculate efficiency for multiple hydropower turbines in real time.

Process 700 includes receiving a user request for a target quantity of electricity from a hydropower generation facility at 702. The electricity may be requested immediately, as soon as practically possible, or the electricity may be requested in advance.

At 704, the process 700 receives head height data. The head height data may be received from monitoring equipment located upstream and/or downstream of the hydropower generation facility 104, from other computing systems (e.g., via a communications network), from manual entry of a user, or the like.

At 706, the process receives efficiency curve data for each of a plurality of hydropower turbines. The hydropower turbines may all be located in the same hydropower generation facility 104 or the hydropower turbines may be located in multiple separate facilities. The efficiency curve data may include at least one indication of a rough zone for some or all of the respective hydropower turbines. By way of example, the efficiency curve data may be similar to the efficiency curves shown in FIG. 3. The efficiency curve data may depend on the head height received at 704. By way of further example, FIG. 2 illustrates change in an efficiency curve at different head heights.

At 708, the process 700 creates piecewise linear representations of the efficiency curves. The piecewise linear representations may be created by processes such as those discussed above in conjunction with FIG. 2.

At 710, the process 700 identifies operational parameters of the hydropower turbines that result in generating at least the target quantity of electricity requested at 702. The identified operational parameters, when implemented, will result in generating the target quantity of electricity at a highest efficiency. The operational parameters may include such things as gate positions, turbine operation, and the like. The highest efficiency represents operational parameters that will result in the hydropower turbines generating the target quantity of electricity with a minimal total flow through the hydropower turbines (i.e., most electricity for the least water). The operational parameters may also be based on additional data or requirements such as a requirement to operate a must-run the hydropower turbine. If one of the plurality of hydropower turbines is designated as a must-run the hydropower turbine, then the operational parameters may find the highest efficiency possible that utilizes the must-run a hydropower turbine.

At 712, the process 700 determines if a rough zone is violated. If a rough zone is violated, process 700 follows the "yes" branch and returns to 710 where identifying of the operational parameters is modified to avoid the rough zone. Identification of operational parameters may be repeated until no rough zones are violated and process 700 proceeds along "no" path to 714.

At 714, the process 700 determines if the head height has changed. During operation of the hydropower turbines, the water level in the reservoir above the hydropower generation facility 104 may increase or decrease depending on the difference between the inflow rate to the reservoir and the outflow rate through the hydropower generation facility 104. Since efficiency curves for the hydropower turbines may be based on the head height, if the head height data has changed the process 700 proceeds along the "yes" path and returns to 704. Modified efficiency curve data is received at 704 and the process 700 may repeat iteratively to identify accurate operational parameters based on the current head height. If the head height has not changed, the process 700 proceeds along "no" path to 716.

At 716, the process 700 presents recommended operational parameters. The recommendations may be presented in a user interface for example a user interface generated by the user interface module 510. In some implementations, the same user interface that presents the recommended operational parameters may also allow a user 102 to adjust the operation of the hydropower generation facility 104. In some implementations, it may also be possible to create authorize the system to automatically implement the recommended operational parameters without direct human interaction. For example, the automatic control module 512 may function to automatically implement recommended parameters.

Conclusion

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method for real-time optimization of a hydropower generation facility comprising:
   receiving a request for a quantity of electricity;
   receiving efficiency curve data for each of a plurality of hydropower turbines;
   creating, by one or more processors in a computing device, piecewise linear representations of the efficiency curve data; and
   identifying, based at least in part on the piecewise linear representations, operational parameters of the plurality of hydropower turbines that result in generating at least the quantity of electricity at a high efficiency.

2. The method of claim 1, wherein the efficiency curve data includes at least one indication of a rough zone and the identifying is based at least in part on the rough zone.

3. The method of claim 1, wherein at least one of the plurality of hydropower turbines is a must-run hydropower turbine and the operational parameters specify operation of the must-run hydropower turbine.

4. The method of claim 1, wherein the plurality of hydropower turbines is located in a same hydropower generation facility.

5. The method of claim 1, wherein the plurality of hydropower turbines are located in at least two hydropower generation facilities.

6. The method of claim 1, wherein the high efficiency comprises operational parameters that, when implemented, results in the plurality of hydropower turbines generating at least the quantity of electricity with a minimal total flow through the plurality of hydropower turbines.

7. The method of claim 1, further comprising:
   receiving current operational parameters of the plurality of hydropower turbines; and
   quantifying a difference between a quantity of electricity generated with the current operational parameters and a quantity of electricity generated with the identified operational parameters.

8. The method of claim 1, further comprising receiving head height data, wherein the efficiency curve data is based at least in part on the head height data.

9. The method of claim 8, further comprising iteratively receiving modified efficiency curve data responsive to receiving changed head height data and repeating the creating and the identifying using the modified efficiency curve data.

10. One or more computer-readable storage media storing computer-executable instructions that, when executed by a processor, perform acts comprising:
    receiving an efficiency curve for a hydropower turbine;
    generating a piecewise linear model of the efficiency curve; and
    determining optimal operating parameters for the hydropower turbine based at least in part on the piecewise linear model of the efficiency curve.

11. The computer-readable storage media of claim 10, wherein the efficiency curve provides an operational efficiency of the hydropower turbine for a given rate of water flowing through the hydropower turbine.

12. The computer-readable storage media of claim 11, wherein the operational efficiency of the hydropower turbine is represented as a ratio of power generated by the hydropower turbine to a head height of the water passing through the hydropower turbine.

13. The computer-readable storage media of claim 12, wherein the head height is an average of multiple measured head heights.

14. The computer-readable storage media of claim 10, wherein the piecewise linear model is a continuous function.

15. The computer-readable storage media of claim 10, wherein the determining comprises identifying a linear segment of the piecewise linear model based at least in part on a rate of water flowing through the hydropower turbine and identifying a corresponding efficiency of the hydropower turbine based at least in part on the identified linear segment.

16. A system for real-time optimization of a hydropower generation facility comprising:
- one or more processors;
- a memory coupled to the processors;
- a request module executable on the processors and configured to receive a request for electricity;
- a model of the hydropower generation facility that includes one or more hydropower turbine efficiency curves for the hydropower generation facility;
- a linearization module executable on the processors and configured to generate respective piecewise linear representations of the one or more hydropower turbine efficiency curves; and
- an optimization module executable on the processors and configured to identify operational parameters for the hydropower generation facility, based at least in part on the piecewise linear representations, that result in generation of electricity sufficient to satisfy the request at a high efficiency.

17. The system of claim 16, wherein the hydropower turbine efficiency curves represent an efficiency of a hydropower turbine as a ratio of generated electrical power to a head height of the hydropower generation facility.

18. The system of claim 16, wherein the operational parameters identified by the optimization module comprise a flow rate for one or more hydropower turbines in the hydropower generation facility.

19. The system of claim 16, wherein the operational parameters identified by the optimization module comprise an amount of generated electricity for one or more hydropower turbines in the hydropower generation facility.

20. The system of claim 16, further comprising a market module executable on the processors and configured to identify timing for generation of electricity based at least in part on a variable market price for electricity.

21. The system of claim 16, further comprising a user interface module configured to present the operational parameters to a user.

22. The system of claim 16, further comprising an automatic control module executable on the processors and configured to modify operation of the hydropower generation facility based at least in part on the operational parameters.

* * * * *